US 6,567,873 B1

(12) United States Patent
Henriksen

(10) Patent No.: US 6,567,873 B1
(45) Date of Patent: May 20, 2003

(54) SPINLOCK WITH ADAPTIVE DELAY

(75) Inventor: Dana M. Henriksen, Lindon, UT (US)

(73) Assignee: Novell, Inc., Provo, UT (US)

(*) Notice: Subject to any disclaimer, the term of this patent is extended or adjusted under 35 U.S.C. 154(b) by 0 days.

(21) Appl. No.: 09/516,271

(22) Filed: Feb. 29, 2000

(51) Int. Cl.[7] .............................................. G06F 13/14
(52) U.S. Cl. ...................................... 710/240; 709/104
(58) Field of Search ................................ 710/240, 300, 710/108, 241–243, 53, 110, 113, 8, 3, 200, 307, 125; 709/104

(56) References Cited

U.S. PATENT DOCUMENTS 5,729,765 A * 3/1998 Cheng
5,864,699 A * 1/1999 Merryman
6,314,485 B1 * 11/2001 Potts

OTHER PUBLICATIONS

Bertsekas et al., Data Networks, Second Edition, 1992, 1987, Prentice–Hall, Inc.
J. F. Hayes, *An Adaptive Technique for Local Distribution*, Copyright © 1978 IEEE.
R. L. Rivest, *Network Control by Bayesian Broadcast*, Massachusetts Institute of Technology, Sep. 1985.
J. I. Capetanakis, *The Multiple Access Broadcast Channel: Protocol and Capacity Considerations*, Massachusetts Institute of Technology, Aug. 1977.

* cited by examiner

*Primary Examiner*—Rupal Dharia
*Assistant Examiner*—Kim T. Huynh
(74) *Attorney, Agent, or Firm*—Schwegman, Lundberg, Woessman & Kluth, P.A.

(57) ABSTRACT

A method and apparatus for improving multi-processor performance where the various processors are competing for spinlock acquisition is described. If a spinlock testing processor fails to acquire the spinlock, it re-tries for access after a small wait interval has passed. If the spinlock is still locked, the testing processor retries with an additional increase in the wait interval. Subsequent re-tries progressively increases the wait interval until a maximum wait interval is reached. At this point, the wait interval is reset back to an initial small wait interval and the procedure is repeated until the processor gains access to the spinlock.

20 Claims, 3 Drawing Sheets

SPINLOCK WITH ADAPTIVE DELAY

BACKGROUND OF THE INVENTION

The present invention pertains to improving multi-processor performance in which the various processors compete for spinlock acquisition, and in particular, to optimizing a processor's spinlock acquisition as it competes with other processors to access a shared resource.

In a multi-processor system, several processors typically compete for shared resources, such as memory and Input/Output (I/O) devices. Competition (or contention) occurs when two or more processors attempt to access a shared resource at a given time. To maintain data coherency (i.e., to prevent data from becoming corrupt), only one processor usually gains access to the resource while the other competing processors are excluded until the accessing processor is done with the resource. Resources are shared on the multi-processor system to maximize their usage and further economize the system. In addition, by sharing a resource, a task may be segmented and cooperatively processed by the several processors. This effectively accelerates the task's processing time when compared with a uni-processor system. Sharing of resources is made possible by a multi-tasking operating system that allows the several processors to operate in parallel. In theory, each additional processor multiplies the performance of the system. For example, an eight-processor system may theoretically increase the performance by eight fold over a uni-processor system. However, because of various factors including processor competition and processor synchronization, performance degradation usually occurs.

Take for instance a shared memory system. Unless there is an orderly system for accessing a shared memory, there is a likelihood that two or more processors may modify the same area of the memory simultaneously, resulting in the stored data becoming corrupt. To prevent this, a multi-processor system may use one or more locking mechanisms to control access to the shared memory. In one known method, each processor keeps a status list of all the locks associated with the memory segments. To keep the status list consistent, each lock/unlock action of a processor causes a message to be transmitted to all the other processors so that they may update their lists. Thus, by inquiring its status list before a memory access operation, a processor is able to determine which memory segments are locked/unlocked.

For example, if the memory segment a processor attempts to access is currently locked, the processor may enter a wait mode. On receiving an unlock message for the memory segment, the processor transmits a lock message that locks the segment and enables the processor to gain access to the resource. In another method, a special processor instruction to access a memory segment causes other processors to be locked out at the instruction level for that particular memory segment. This special instruction is available to the multi-processor system, which instructs the operating system to perform the lock-out. While such elaborate schemes may ensure orderly access to the shared memory, such schemes require substantial overhead and add complexity to the system. Moreover, because each processor needs to be synchronized for an access operation, this results in a detriment to the overall multi-processing performance and also prolongs memory access operations.

In another known method, processor requests for memory access are organized according to a queuing scheme that ensures sequential consistency. However, implementation of such a scheme requires a substantial overhead on behalf of the operating system. More importantly, because of the first in first out (FIFO) nature of the queue, subsequent processor memory requests are biased over those requests already in the queue. When congestion arises in the queue, unacceptable delays occur on the subsequent requests which degrade the overall performance of the system.

Spinlocks (sometimes referred to as "semaphores") are mechanisms that allow for an orderly access to a shared resource such as a memory. The shared memory system typically contains a number of spinlocks that controls access to the memory. For example, a spinlock may ensure that only one processor is accessing a segment of the memory at any given time. Each segment of the memory has a spinlock associated with it and whenever a processor requires access to a segment, it determines whether the spinlock is "locked" or "unlocked." A lock status of the spinlock indicates that another processor is currently accessing that segment of the memory. Conversely, an unlocked status indicates that the segment is available for access. For example, when a processor attempts to access a memory segment, regardless of the status of the other processors, it simply tests the spinlock associated with the segment to determine whether that segment is already being accessed by another processor. If not, the testing processor acquires and locks the spinlock to exclude other processors from accessing the segment. The processor then performs one or more operations on the data contained in the segment. Because the accessing processor has locked the spinlock, the processor is able to perform the various operations without interference from the other processors. Once the processor has completed its access, it unlocks the spinlock to allow access by other processors.

Generally, processors that access a particular segment at the same time compete for acquisition of the spinlock. Processors that fail to gain access typically wait for a period of time before re-attempting access. This is generally performed by causing the processor to enter into a finite loop (i.e., the processor "spins," hence, spinlock). A waiting processor continuously tests the spinlock until it gains access. One problem associated with a waiting processor continuously testing the spinlock is that, as the number of processors competing for the spinlock increases, severe memory contention arises. This, in turn degrades overall system performance. Accordingly, what is needed is a way to reduce spinlock access contentions and to increase multi-processing performance.

SUMMARY OF THE INVENTION

The present invention comprises a method and apparatus for optimizing acquisition of a spinlock by a processor in a multi-processor system when various processors compete for spinlock acquisition. According to the invention, if a processor fails to acquire the spinlock, it reattempts access of the lock after waiting a period of time. Here, the wait period is preferably a relatively small wait period If the spinlock is still locked when the processor reattempts access, the wait period is incremented a predetermined amount. Subsequent unsuccessful attempts to access the spinlock progressively increase the wait period until a maximum wait period is reached. At this point, the wait period is reset to its initial small wait interval and the procedure is repeated until the processor gains access to the spinlock.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
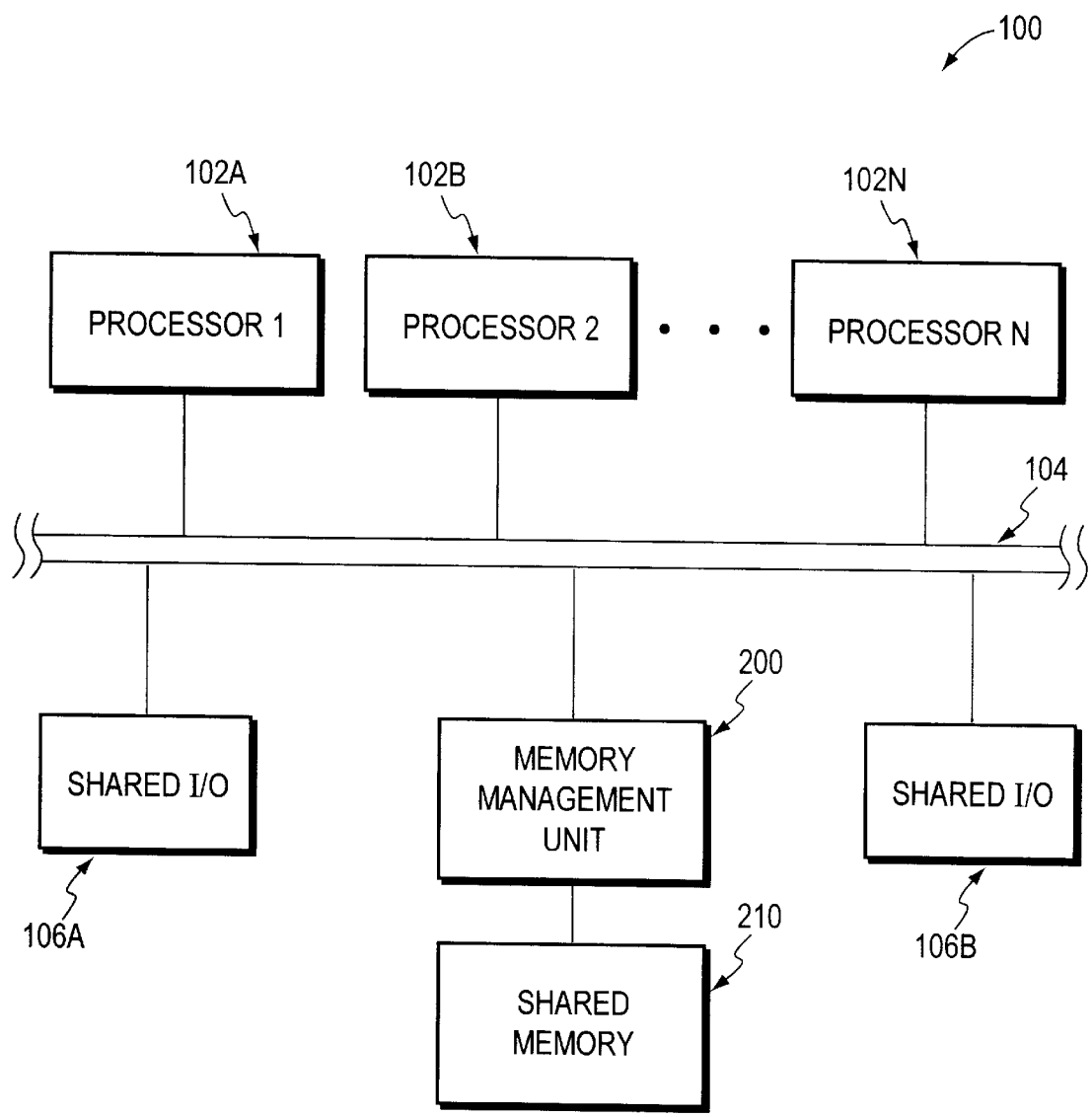
FIG. 1 is an exemplary multi-processor system in which an embodiment of the invention may be implemented.

Referring to FIG. 1, a multi-processor system 100 in which an embodiment of the invention may be implemented includes a plurality of processors 102A–N that operates in parallel and competes for the various shared resources. The shared resources may include shared Input/Output (I/O) devices 106A, 106B or a shared memory 210. The system 100 further includes a memory management unit 200, which controls the read/write access to the shared memory 210. The processors 102A–N, the shared I/O devices 106A, 106B and the memory management unit 200 communicate over a system bus 104. The processors 102A–N access the shared memory 210 via the memory management unit 200. A multi-tasking operating system which may reside in the shared memory coordinates the interaction between the various processors 102A–N, and between the processors 102A–N and the shared memory 210 via the memory management unit 200 such that the processors operate cooperatively and in parallel. The operating system further coordinates the interaction between the various processors 102A–N, and the various shared Input/Output (I/O) resources 106A, 106B. In theory, the performance of the multi-processor system is linearly related to the number of processors used in the system. For example, an eight-processor system should perform eight folds over a uni-processor system. However, in practice, due to various factors such as program task data structure, memory contention and synchronization, I/O contention and synchronization and so forth, the use of multiple processors degrades overall system performance. Therefore, optimizing the various factors increases the system's performance closer to its ideal performance.

Figure 2:
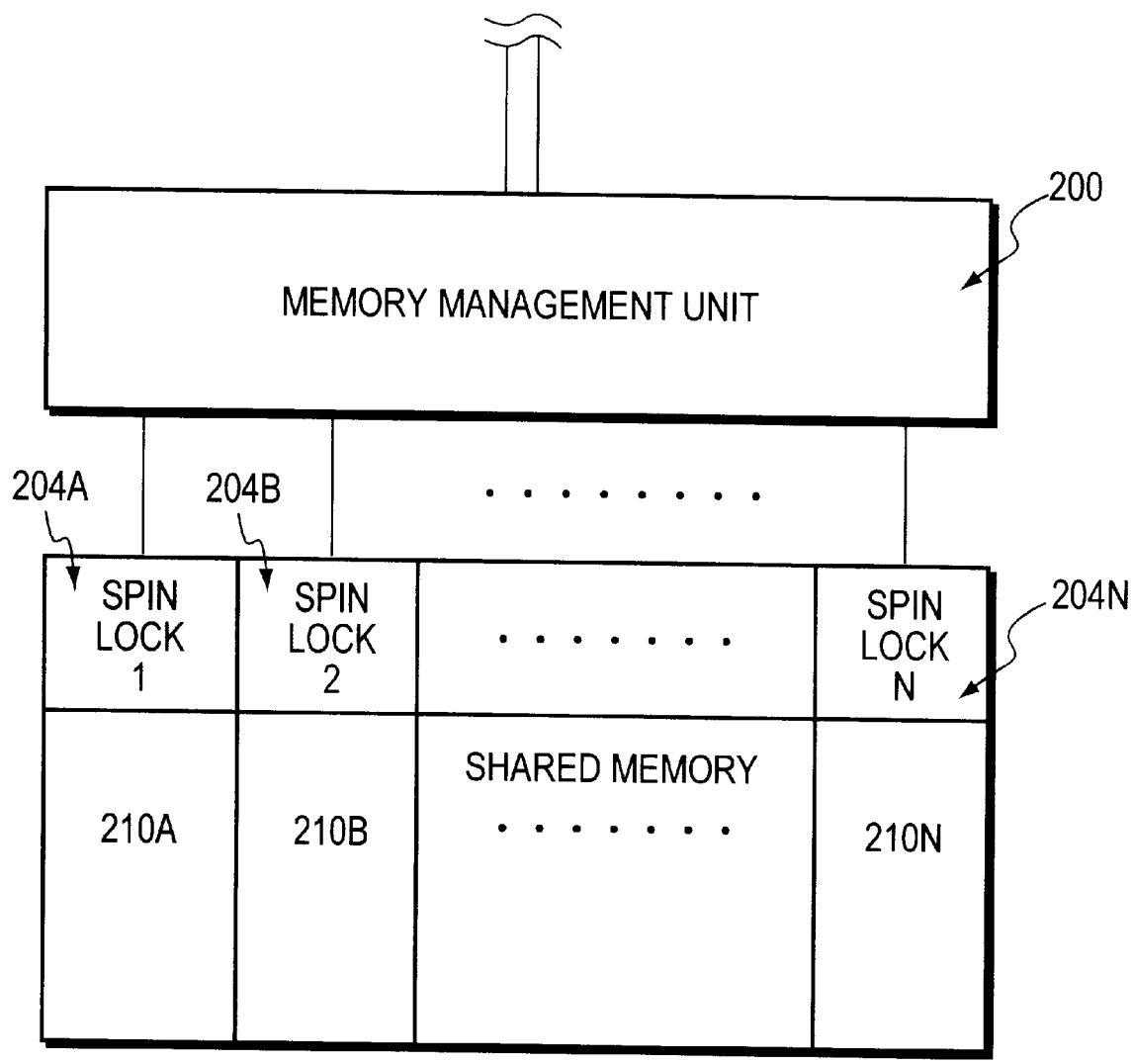
FIG. 2 is a more detailed view of a memory management unit and a shared memory including spinlocks.

FIG. 2 is a more detailed logical schematic diagram of the memory management unit 200 and the shared memory 210. The shared memory 210 includes a plurality of spin locks 204A–N that perform as lock mechanisms for the various memory segments 210A–N, which contain data accessible by the processors. In other words, each memory segment containing data has an associated spinlock. Although the figure shows the spin locks 204A–N as part of the shared memory 210, they could easily be entities separate and apart from the shared memory. In one example, a spinlock is a register whose context indicates whether it is locked or unlocked (e.g. "1" or "0"), the significance of which will be described further below. The multi-tasking operating system in conjunction with the memory management unit 200 and the spinlocks 204A–N maintain coherency of the data processed by the plurality of processors 102A–N.

Spinlocks are lock mechanisms that ensure orderly access to a shared memory. For example, a spinlock may ensure that only one processor is accessing a segment of the memory at any given time. Each segment of the memory 210A–N has a respective spinlock 204A–N associated with it and whenever a processor requires access to a segment, it first tests the associated spinlock to determine whether it is locked or unlocked. A locked status of the spinlock indicates that another processor is currently accessing that segment of the memory. Conversely, an unlocked status indicates that the segment is available for access. In other words, when a processor needs to access a memory segment, it tests the associated spinlock to determine whether another processor is currently accessing that segment. If not, the testing processor acquires and locks the spinlock to exclude other processors from access. The processor then typically performs one or more operations on the data contained in the segment.

Depending on the design of the multi-processor architecture, in one example, the length of time a processor accesses a segment varies from operation to operation. For example, if the processor is performing a simple read operation, the time that it keeps the spinlock locked may be brief. In another instance, if the processor is performing a complicated modification of the data, the time it keeps the spinlock locked may be lengthy. Once the processor has completed its access, it releases the spinlock for other processors to access the segment.

Generally, processors accessing a particular segment at the same time compete for the acquisition of the spinlock. Processors that fail to gain access wait for a period of time before re-attempting access. This is generally performed by causing the processor to enter into a finite loop. Generally, a waiting processor continuously tests the spinlock until it gains access. One problem associated with the continuous testing by a waiting processor is that severe memory contention occurs as the number of processors competing for memory access increases. This in turn degrades overall system performance.

Figure 3:
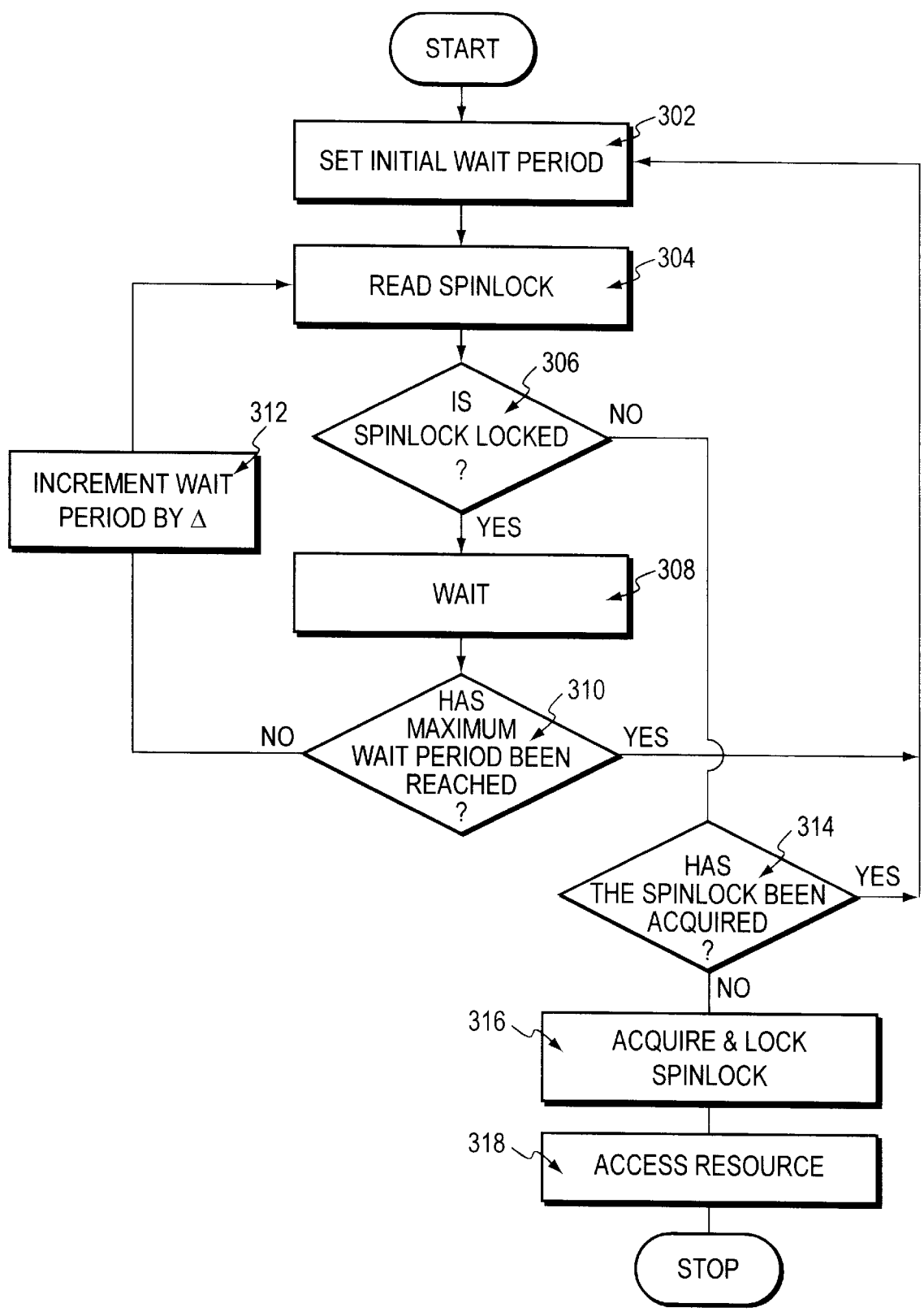
FIG. 3 is a flow diagram that shows an optimization procedure for a processor that competes with the other processors to access a shared resource via a spinlock in accordance with the invention.

FIG. 3 is a flow diagram that shows a processor optimization procedure for spinlock acquisition as it competes with the other processors to access a shared resource. When implemented in software, the procedure is translated to computer executable instructions for performing the necessary steps. Preferably, the instructions are implemented as part of a data coherency procedure in the operating system. Alternatively, the instructions may be implemented as a separate entity from the operating system. The instructions are normally stored in a processor executable medium or they may be transmitted by a computer data signal contained in a carrier wave or packets over a transmission medium. The processor executable medium may include a semiconductor memory, a magnetic storage device (e.g., a hard disk drive), an optical storage device (e.g., a compact disk drive) or the like. The procedure may be also reduced to an electronic circuit form such as Application Specific Integrated Circuit (ASIC).

Using a shared memory as an example, it is found that there is a substantial memory contention in the various segments of the memory as the processors compete for spinlock acquisition. A processor unable to acquire the spinlock continuously tests the spinlock until it is acquired. However, as the number of processors competing for the spinlock increases, severe memory contention arises which, in turn, degrades overall system performance. Furthermore, as mentioned above, certain spinlock acquisitions are held briefly while others are held for lengthy periods of time. Thus, continuous testing of the spinlock when its holding period is lengthy merely increases memory contention, hurting overall system performance.

Referring to block 302 at the inventive procedure, an initial wait interval is set at a minimal number of loops to allow the processor that is testing the spinlock to quickly complete the cycle so that it may retest the spinlock in the event it fails to acquire the lock. In blocks 304–306, the processor reads the spinlock to determine whether the spinlock is locked or unlocked. A locked spinlock generally indicates that another processor has acquired the spinlock and thus, is unavailable to the testing processor. In one example, the spinlock is a register and the processor reads its content to determine its status. For instance, an asserted bit ("1") in the register may indicate that the spinlock is locked. Conversely, an unasserted bit ("0") may indicate that the spinlock is available. If the spinlock is locked, then in block 308, the processor executes a "tight" loop wherein the number of loops corresponds to the wait period which, in this instance, is the initial wait interval. Preferably, the initial number of loops falls within a range selected by a pseudo-random generator. Such randomness has many advantages, one of which is that potential deadlocks occurring among the competing processors are minimized.

In block 310, a determination is made as to whether the number of loops the processor has executed is within a maximal number of loops. The maximal number of loops (which correspond to a maximum wait period) is set, preferably, as not to disadvantage the waiting processor over the other competing processors accessing the same segment of memory. If the current number of loops is not the maximal number, then in block 312, the number of loops is increased by an increment (delta) which may be predetermined, or alternatively, may be randomly selected within a range. The processor then reads the spinlock to determine if it is available. If not, then the processor executes the increased number of loops. Repetition of blocks 304–312 occurs until the processor acquires the spinlock or alternatively, the maximal number of loops has been reached.

Note that with each repetition of the blocks, the number of loops progressively increases and thus, the wait interval increases. This feature is based on the concept that if the processor is not able to access the spinlock during the initial attempts, then the processor should gradually "back off" with fewer tries towards the end. This gives the competing processors more opportunities to access the spinlock and thereby reduces contention. On a different note, in instances where the length of access to a resource varies according to the operation performed by a processor, if the testing processor is unable to acquire the spinlock during the initial attempts, it is assumed that the spinlock remains locked for an extended period of time, and subsequent attempts are performed with longer delays. In the event the maximal number of loops has been reached in block 310, the processor reverts to block 302, wherein the number of loops is reset at a minimal number. The processor then repeats the process again until it finally accesses the spinlock.

In block 306, if the testing processor detects that the spinlock is available, then in block 314, the processor performs an atomic access to acquire the spinlock. An example of an atomic access is a read-modify-write instruction whenever each cycle of the instructions is executed without interruption (i.e., atomically). Thus, if the content of the spinlock register is "0" as determined by the read cycle of the atomic access, then the processor modifies the content by writing a "1" to the register, thereby locking the spinlock. Note that in block 304, instead of performing a read instruction, the testing processor could perform an atomic access to the spinlock. However, a substantial burden is placed on the system if the atomic access instruction is used frequently, which results in system performance degradation. Therefore, it is desirable to perform the atomic access if the spinlock is determined to be available.

In block 314, it is possible that during the interim between the determination that the spinlock is available and the execution of the atomic access that a competing processor has acquired the spinlock. Thus, if the processor receives a "1" during the read cycle of the atomic access, a competing processor has acquired the spinlock. As a result, the remaining cycles of the atomic access instruction are cancelled and the testing processor returns to block 302 to repeat the spinlock acquisition procedure. Otherwise, if the atomic access is successful, the testing processor acquires the spinlock in block 316 and in block 318, the processor has exclusive access to the resource.

The procedure described above, among its many advantages, has a property of reducing memory contention when the spinlocks are held for long periods of time, while not increasing latency of acquiring locks that are held for short periods of time. An improved multi-processor system in which a processor's spinlock accession is optimized has been described. It will be apparent that other variations and modifications may be made to the described embodiments, with the attainment of some or all of their advantages. Therefore, it is the object of the appended claims to cover all such variations and modifications that come within the true spirit and scope of the invention.

What is claimed is:

1. A method of optimizing acquisition of a spinlock by a processor in a multi-processor system in which various processors compete for spinlock acquisition, the method comprising:

a) establishing a wait period to a minimal wait interval by using a pseudo-random generator;

b) testing a spinlock to determine if the spinlock can be acquired;

c) waiting in accordance with the wait period if the spinlock is locked;

d) incrementing the wait period to an increased wait interval, wherein the increased wait interval is randomly selected within a range; and e) repeating steps b)–d) until the spinlock is acquired.

2. The method as in claim 1, further comprising:

establishing a maximal wait interval;

determining whether the wait period has incremented to the maximal wait interval;

resetting the wait period to the minimal wait interval if the maximal wait interval has been reached; and repeating steps b)–d).

3. The method as in claim 1, wherein testing and acquiring the spinlock comprises:

checking a status of the spinlock to determine if the spinlock is available; and performing an atomic access to lock the spinlock if the spinlock is available.

4. The method as in claim 1, wherein the spinlock is implemented as a register and wherein the step of checking comprises the step of reading a content of the register.

5. The method of claim 1 wherein in waiting, the method loops for a number of loop iterations defined by the wait period.

6. The method of claim 5 further comprising, maintaining a current loop count associated with waiting.

7. The method of claim 6 further comprising, resetting the wait period to the minimum wait interval when the current loop count exceeds a maximum loop count.

8. A processor executable medium having instructions contained therein, which when executed by a processor performs a method of optimizing an acquisition of a spinlock by a processor in a multi-processor system in which various processors are competing for spinlock acquisition, the method comprising:

a) setting a wait period to a minimal wait interval, by using a pseudo-random generator;

b) testing a spinlock to determine if the spinlock can be acquired;

c) waiting in accordance with the wait period if the spinlock is locked;

d) incrementing the wait period to an increased wait interval, wherein the increased wait interval is randomly selected from a range; and e) repeating steps b)–d) until the spinlock is acquired.

9. The processor executable medium as in claim 8, further comprising:

establishing a maximal wait interval;

determining whether the wait period has reached a maximal wait interval;

resetting the wait period to the minimal wait interval if the maximal wait period has been reached; and repeating steps b)–d).

10. The processor executable medium as in claim 8, wherein testing and acquiring the spinlock comprises:

checking a status of the spinlock to determine if the spinlock is available; and performing an atomic access to lock the spinlock if the spinlock is available.

11. The process executable medium as in claim 8, wherein the spinlock is implemented as a register and whereas the step of checking comprises the step of reading a content of the register.

12. The processor executable medium of claim 8 wherein in waiting, the processor iteratively executes a tight loop when waiting.

13. The processor executable medium of claim 8 further comprising, setting a maximum wait period for the processor, wherein when the processor has waited in excess of the maximum wait period, the wait period is reset to the minimum wait interval.

14. The processor executable medium of claim 13 wherein in setting the maximum wait period, the maximum wait period is set so as to not disadvantage the processor when competing with other processors.

15. A multi-processor system for optimizing an acquisition of a spinlock by a processor in a multi-processor system in which various processors are competing for spinlock acquisition, the system comprising:

at least processor programmed to set a wait period to a minimal wait interval, the processor further programmed to test a spinlock to determine if the spinlock can be acquired, and wherein the wait period is set by a pseudo-random generator;

the processor further programmed to wait in accordance with the wait period if the spinlock is locked;

the processor further programmed to increment the wait period to an increased wait interval by selecting a random increment value from a range; and the processor further programmed to test the spinlock, to wait and to increment the wait interval until the spinlock is acquired.

16. The multi-processor system as in claim 15, further comprising:

the processor programmed to determine whether the wait period has incremented to a maximal wait interval; and the processor further programmed to reset the wait period to the minimal wait interval if the maximal wait interval has been reached.

17. The multi-processor system of claim 16, wherein the maximum wait interval is a maximum number of loops for the processor to execute while waiting.

18. The multi-processor system of claim 17, wherein the maximum wait interval is initially set so as not to disadvantage the processor with respect to the various processors competing for the spinlock.

19. The multi-processor system as in claim 15, wherein the processor programmed to test and acquire the spinlock comprises:

the processor programmed to perform a read operation on the spinlock to determine if the spinlock is available; and the processor further programmed to perform an atomic access to lock the spinlock if the spinlock is available.

20. The multi-processor system as in claim 15, wherein the spinlock is a register and the processor programmed to test the spinlock includes reading a content of the register.

* * * * *